Patented Feb. 12, 1924.

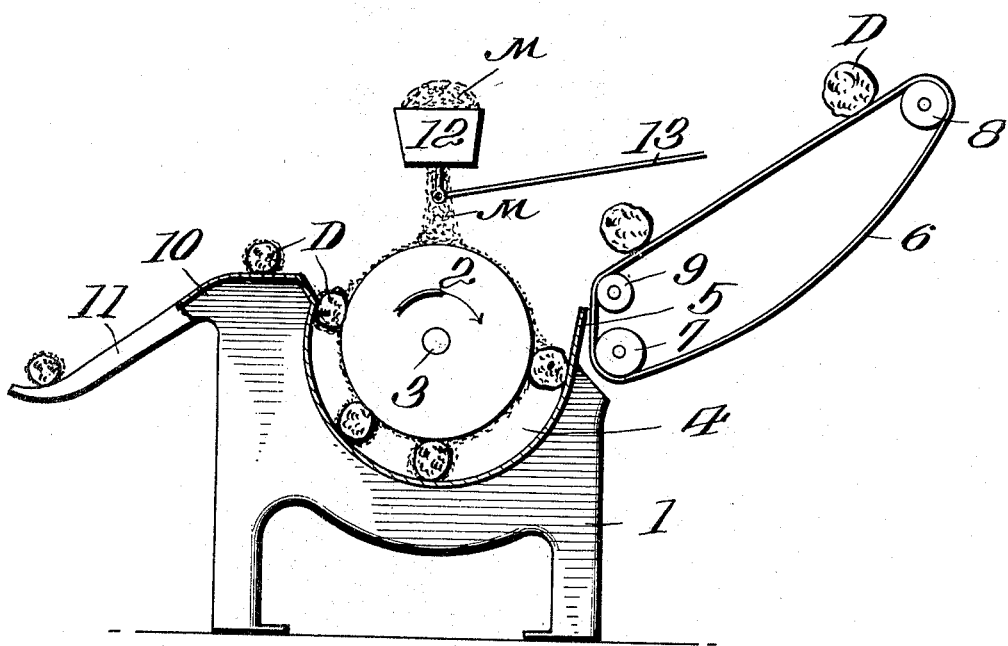

1,483,704

UNITED STATES PATENT OFFICE.

PHILIP WAKEMAN WILCOX, OF ATLANTA, GEORGIA.

PROCESS OF PREVENTING AN EDIBLE FROM ADHERING TO THE SURFACE ON WHICH IT IS COOKED.

Application filed May 9, 1923. Serial No. 637,786.

*To all whom it may concern:*

Be it known that I, PHILIP WAKEMAN WILCOX, a citizen of the United States, residing at Atlanta, in the county of Fulton, State of Georgia, have invented certain new and useful Improvements in Processes of Preventing an Edible from Adhering to the Surface on Which it is Cooked, of which the following is a description, reference being had to the accompanying drawing and to the figures of reference marked thereon.

The invention relates to a new and useful process of preventing an edible from adhering or sticking to the surface on which it is cooked, and more particularly to the process of applying grease between the contacting parts for accomplishing this purpose.

An object of the invention is to provide a process whereby the grease may be applied in a dry, hard, finely powdered state whereby a small portion only thereof will adhere to the surface to which it is applied so that the amount of grease used is reduced to a minimum.

A further object of the invention is to provide a process of the above character wherein the grease remains in a dry, hard, powdered form until heat is applied, after which the grease forms a thin, oily film between the contacting surfaces to prevent one from adhering to the other.

In the drawings, I have illustrated partly in side elevation and partly in section, one form of apparatus which may be utilized in carrying out my improved process for the purpose of facilitating an understanding of the invention.

Heretofore, in the art of cooking, and particularly in that of bread making, grease has been used for preventing the loaf from adhering or sticking to the pan in which it is cooked, and this grease has been applied to the pans in liquid or semi-liquid form by means of brushes, swabs or the like. This has proven a most unsatisfactory and unsanitary mode of applying grease, and has been a constant source of annoyance and dissatisfaction to bakers for several reasons; it is practically impossible to apply the grease uniformly to the pans or surfaces, and this results in a great waste in the amount of grease used, and again, the grease spatters and collects dust and dirt, and eventually collects upon the bread pans themselves, resulting in the well known and unsightly burned spots on the bread.

It has also been applied to the loaves in liquid form, but this has its objection, in that a large quantity of grease is necessary, and furthermore, any handling of the loaf covered with the wet grease is impractical. Then again, any pits or crevices in the dough lump collects too much grease, resulting in burned spots or lines.

By my improved process, I accomplish the greasing of the contacting surfaces of the edible and the cooking utensil so as to prevent any adhering or sticking during cooking, by the use of the grease in a dry, finely powdered form, which enables a minimum amount of grease to be used and wherein also the grease may be handled in a much more sanitary way. The oil or greasing medium may be any edible, vegetable or mineral oil or fat, which can be effectively finely powdered, or which is susceptible to hydrogenization to a degree sufficient to be rendered into a suitable pulverulent form at ordinary temperature, and which when heated, as during cooking, will melt. I prefer to use cotton seed oil, although there are numerous fats and fatty oils that will answer the purpose as well. The fat is preferably hardened by hydrogenization to such a state of hardness that it will resist melting, except in a high temperature. It is then reduced in any suitable way to very fine powder so that the grease may be dusted or brushed on the metal pan surface, if desired, and will adhere thereto to a certain extent. It is also in a dry state so that that which does not adhere to the metal may be readily reclaimed. The essential feature consists in that a fairly complete coating of the dry powdered grease shall adhere to the metal surfaces, and then when heat is applied to the metal, it will at once melt and run into a thin oily film completely covering the metal surface.

I may apply the powdered grease directly to the edible, as for example, in connection with bread baking, the grease may be applied directly to the dough lump. To facilitate the application of the grease to the dough lump and to reduce the amount of grease to a minimum, this dry powdered grease may be mixed with a certain proportion of flour or starch.

In the drawings, I have illustrated one method of applying the grease to the dough lump. The apparatus consists of a framework 1 in which is rotatably mounted a traveling carrier or drum 2, said drum rotating about an axis 3. This traveling drum is spaced from the frame 1 so as to form a circular passageway 4. A lining or guide strip 5 is arranged so as to direct the balls or other forms of dough from the traveling belt conveyor 6 mounted on usual rollers 7 and 8, partially about the drum. An additional roller 9 is spaced from the roller 7 at the inner end of the belt conveyor and acts to guide the dough lumps into the curved space between the guide or molding strip 4 and the drum 2. The dough lumps are indicated at D and are placed on the belt 6 and are directed into the curved passageway as stated above. This curved passageway grows smaller in cross section toward its delivery end, and thus it is that the dough lumps are rolled and formed as they pass through the apparatus. These dough lumps are delivered on to the table 10. This apparatus is of the usual construction and further description thereof will not be necessary. Directly above the drum 2 there is a hopper 12 in which the powdered grease indicated at M is placed. This container 12 is provided with a bottom outlet controlled by a suitable type of shutter which is operated by a pitman 13 which in turn is connected with any suitable source of power. The hydrogenated oil or powdered grease M placed in the container 12 will be sifted on to the drum 2 so that the drum will be covered with a light layer of the mixed powdered grease and flour or starch. The dough lumps take the powdered material from the drum so that each dough lump becomes fairly well coated with the powdered grease and flour, or if no flour is used, the powdered grease alone. It is understood that this powdered grease is dry and hard at ordinary temperatures. The dough lump is then placed in the pan which does not need any greasing, and there will be a thin layer or coating of the powdered grease between the dough lump and the surface of the cooking pan with which it makes contact. As soon as heat is applied for cooking, then this grease melts and forms a thin oily film which lies between the edible and the surface on which it is cooked, and prevents any sticking or adhering of one to the other.

As above noted, the powdered grease may be applied directly to the pan and a certain amount thereof will adhere to the metal surface. When the pan is heated, either with the dough lump within or before, a thin oily film will be formed on the surface of the metal which will prevent the edible from sticking thereto when it is cooked.

By my improved process, it will be noted that inasmuch as the grease is in a dry, hard form, the surfaces may be well greased by a minimum amount of grease. Then again, it may be applied in a much more sanitary way, in that it may be sifted or dusted on to the surfaces to be greased or applied thereto in any other suitable way. Furthermore, inasmuch as it is applied in a dry hard state, there is less likelihood of dust, dirt and bacteria accumulating therein.

This application is a continuation of my application Serial Number 543,356, filed March 13, 1922.

Having thus described the invention, what I claim as new and desire to secure by Letters Patent, is—

1. The method of preventing an edible from adhering to the utensil in which it is cooked, consisting in applying to one of the contacting surfaces an oil in such finely powdered form as to adhere to the surface to which it is applied and to form thereon a coating which, when heat is applied for cooking, melts and prevents said contacting surfaces from adhering.

2. The method of preventing an edible from adhering to the utensil in which it is cooked, consisting in applying to the surface of the edible after it is shaped and ready to be cooked, an oil in such finely powdered form as to adhere to the surface of the edible and to form thereon a coating, placing the edible on the cooking utensil with the dry powdered oil between the contacting surfaces whereby when heat is applied for cooking, said oil melts and prevents said contacting surfaces from adhering.

3. The method of preventing an edible from adhering to the utensil in which it is cooked, consisting in applying to one of the contacting surfaces a hydrogenated oil in such finely powdered form as to adhere to the surface to which it is applied and to form thereon a relatively thin coating which, when heat is applied for cooking, melts and prevents the contacting surfaces from adhering.

4. The method of preventing an edible from adhering to the utensil in which it is cooked consisting in applying to one of the contacting surfaces, an oil in such finely powdered form as to adhere to the surface to which it is applied, which powder when heat is applied thereto, melts and forms a thin oily film lying between the edible and the utensil for preventing the contacting surfaces from adhering.

In testimony whereof, I affix my signature.

PHILIP WAKEMAN WILCOX.